United States Patent
Best et al.

(10) Patent No.: US 6,607,804 B1
(45) Date of Patent: Aug. 19, 2003

(54) MOLDED PART MADE OF AN ELECTRICALLY CONDUCTIVE CERAMIC AND PROCESS FOR THE PRODUCTION OF CONTACT ZONES ON SUCH MOLDED PARTS

(75) Inventors: Walter Best, Duren (DE); Oliver Benthaus, Duren (DE); Wolfgang Schäfer, Duren (DE); Uwe Schumacher, Stolberg (DE)

(73) Assignee: Thomas Josef Heimbach Gesellschaft mit beschrankter Haftung & Co., Duren (DE)

( * ) Notice: Subject to any disclaimer, the term of this patent is extended or adjusted under 35 U.S.C. 154(b) by 0 days.

(21) Appl. No.: 09/260,147

(22) Filed: Mar. 1, 1999

(30) Foreign Application Priority Data

Mar. 9, 1998 (DE) .......................... 198 09 976

(51) Int. Cl.⁷ ................................. B32B 3/12
(52) U.S. Cl. .................. 428/116; 55/523; 422/177; 422/180; 422/211; 427/123; 427/124; 427/126.2; 427/294; 427/350; 427/372.2; 427/375; 427/376.3; 427/376.7; 427/383.1; 427/383.5; 428/174; 428/177; 428/188; 428/304.4; 428/306.6; 428/307.3; 428/469; 428/699; 428/539.5
(58) Field of Search .................. 428/116; 427/123, 427/124, 126.2, 294, 350, 372.2, 375, 376.3, 376.7, 383.1, 383.5; 55/523, 529

(56) References Cited

U.S. PATENT DOCUMENTS

| | | | | |
|---|---|---|---|---|
| 3,927,300 A | * | 12/1975 | Wada et al. ................ 219/381 |
| 4,017,426 A | * | 4/1977 | Carbonnel et al. .......... 252/520 |
| 4,177,778 A | * | 12/1979 | Naitou et al. |
| 4,232,214 A | * | 11/1980 | Shioi et al. |
| 4,505,107 A | | 3/1985 | Yamaguchi et al. .......... 60/303 |
| 4,535,589 A | * | 8/1985 | Yoshida et al. .............. 60/303 |
| 4,795,723 A | * | 1/1989 | Nishikawa et al. ........... 501/98 |
| 4,813,231 A | | 3/1989 | Bykowski ..................... 60/274 |
| 4,861,641 A | * | 8/1989 | Foster et al. ................. 428/137 |
| 4,897,096 A | | 1/1990 | Pischinger et al. ........... 55/283 |
| 5,017,533 A | * | 5/1991 | Newkirk et al. ............. 501/127 |
| 5,130,055 A | * | 7/1992 | Yasutomi et al. ........... 252/518 |
| 5,378,417 A | * | 1/1995 | Yasutomi et al. ............. 264/61 |
| 5,423,904 A | | 6/1995 | Dasgupta ..................... 96/146 |
| 5,449,541 A | * | 9/1995 | Lipp et al. |
| 5,526,867 A | * | 6/1996 | Keck et al. .................... 164/97 |
| 5,614,043 A | * | 3/1997 | Ritland et al. ................ 156/89 |

FOREIGN PATENT DOCUMENTS

| | | |
|---|---|---|
| DE | 37 04 930 | 4/1988 |
| DE | 37 29 126 | 4/1989 |
| DE | 37 32 654 | 4/1989 |
| DE | 40 28 720 | 4/1991 |
| DE | 41 04 220 | 8/1992 |
| DE | 41 30 630 | 3/1993 |
| DE | 44 13 127 | 10/1995 |
| EP | 0 336 883 | 10/1989 |
| EP | 0 796 830 | 9/1997 |
| JP | 61-187912 | 8/1986 |
| JP | 4-342488 | 11/1992 |
| JP | 6-173645 | 6/1994 |
| WO | WO 93/13303 | 7/1993 |

OTHER PUBLICATIONS

By M. Boretius et al., "Aktivloten—Stoffschlussiges Fugen keramischer Werkstoffe untereinander und mit Metall", *VDI Berichte*, No. 670, 1988, pp. 699–713 No Month.

* cited by examiner

*Primary Examiner*—Deborah Jones
*Assistant Examiner*—Wendy Boss
(74) *Attorney, Agent, or Firm*—Young & Thompson

(57) ABSTRACT

A filter having two zones, the first zone having a low electrical conductivity and the second zone having a high electrical conductivity at electrode attachment zones due to infiltration of metal within the second zone.

49 Claims, 1 Drawing Sheet

MOLDED PART MADE OF AN ELECTRICALLY CONDUCTIVE CERAMIC AND PROCESS FOR THE PRODUCTION OF CONTACT ZONES ON SUCH MOLDED PARTS

The invention relates to a molded part made of electrically conductive ceramic, in particular filter parts, and the molded part is a flow-through part because of pores and has contact zones for attaching electrodes. The invention further relates to a process for producing contact zones for attaching electrodes to molded parts that are flow-through parts because of pores and are made of electrically conductive ceramic.

Ceramic molded parts are being increasingly proposed as filter elements, but also as supports for catalysts. They are especially suitable for filtering hot gases, since they are extraordinarily temperature-resistant. They are thus to be used, among other things, for removing rust particles in the exhaust gas of diesel engines. Here, silicon carbide has turned out to be an especially suitable ceramic compound, since it is chemically stable and has a great heat conducting capacity and is resistant to temperature and thermal shock (see EP-A-O 796 830, DE-C-41 30 630, EP-A-O 336 883, WO 93/13303).

For use in diesel engines, it is important that the rust particles deposited on or in the molded part be removed at regular intervals, so that the flow resistance in the walls of the molded part do not become too high. A known cleaning method consists in heating the molded part so hot by applying an electrical current that the rust particles ignite and burn up. For this purpose, the molded part must be connected to electrodes by which the electrical current can be introduced into the molded part.

The connection of the electrodes to the molded part must be temperature resistant and it must be able to withstand the strong thermal shocks and the mechanical stresses. Further, as little contact resistance as possible must be sought. Achieving these goals creates considerable difficulties because of the porous and rough surface of such molded parts. Known solutions, as they come out of U.S. Pat. No. 4,505,107, U.S. Pat. No. 4,535,589, U.S. Pat. No. 4,897,096 and U.S. Pat. No. 5,423,904, for example, are not satisfactory.

The object of the invention is thus to configure the contact zones on molded parts of the above-mentioned type so that a secure attachment of the electrodes with low contact resistance is guaranteed.

This object is achieved according to the invention by infiltrating an electrically conductive metal into the pores of the contact zones. To the extent that the ceramic consists of a metallic ceramic compound, a metal that is the same as the metal of the ceramic compound should preferably be used for the infiltration. Understood here as a metallic ceramic compound in the sense of this description is a compound that has at least one metal atom.

It has turned out that by infiltrating an elementary metal, contact zones can be produced that are distinguished by temperature resistance, a stable surface favorable for attaching electrodes, and low contact resistance. Over the entire temperature range, the thermal expansion of the contact zones does not differ significantly from the rest of the areas of the molded part, i.e., there are no thermal stresses that could damage the contact. Further, the contact zones are corrosion resistant.

Under the concept metal—in elementary form and as a component of a ceramic compound—not only metallic, but also metal-like elements are meant in the sense of this description, for example metalloids. Involved here, besides silicon, are wolfram, tantalum, hafnium, zirconium, titanium, molybdenum, etc. The molded part itself can consist, e.g., of metal carbides (SiC, WC, TaC, HfC, ZrC, TiC), metal nitrides (ZrN, TiN), metal borides (TiB$_2$, ZrB$_2$) or silicides (MoSi$_2$) Silicon carbide has proven especially useful.

To prevent the metal to be infiltrated from spreading over the entire molded part, it is proposed that the contact zones have additional contact layers made of an electrically conductive ceramic into which the metal is infiltrated, and suitably the ceramic of the contact layers is the same as that of the molded part. Too great a penetration of the metal into the molded part itself can be prevented above all by making contact layers with finer pores than the molded part itself. In this way, the capillary action in the contact layers is greater than in the molded part. This capillary action limits the infiltration of the metal into the molded part, and it can be quite advantageous if the metal is partly infiltrated beyond the contact layers into the molded part. The contact layers can be at least partly pressed into the molded part. Such contact layers yield smooth and highly conductive contact surfaces.

According to the invention it is further provided that the molded part has a core part and connecting parts that are connected to one another, and the contact zones are on the connecting parts. The infiltration of the metal can thus be limited to the connecting parts by subjecting them alone, separately from the core part, to infiltration conditions and then subsequently connecting them to the core part. Preferably the core part and the connecting parts have the same ceramic base. The connecting parts can be used as end parts. The division of the molded part into core part and end part has the additional advantage that the enclosures for the flow channels going through the end parts can be provided simultaneously with the production of the end part, e.g., by suitable molding of the end parts.

But it is not necessary that the connecting parts simultaneously form the end parts. They can be placed between the parts of a divided core part to achieve other flow paths. In both cases, it is suitable if the connecting parts are made as a continuation of the core part, i.e., especially flow-through channels in the same arrangement with the same cross sections. But alternatively, the connecting parts could also be attached laterally to the core part. Of course numerous core parts can be connected in parallel or in series to each other by the connecting parts.

The connection of the connecting parts to the core part can be performed, for example, by a material joining using active soldering (see M. Boretius, E. Lugschneider, Active Soldering—Material Joining of Ceramic Substances to Each Other and to Metal, VDI Berichte [Reports] No. 670, 1988). But instead there is also the possibility of materially connecting the connecting parts to the core part by a connecting layer made of electrically conductive ceramic, and suitably here also the ceramic of the molded part and of the connecting layer is the same. This yields secure, electrically conductive connection between the parts. Likewise, it can be recommended to make the connecting layer with pores finer than those of the molded part, to be able to infiltrate electrically conductive metal also into the connecting layer. In doing so, the contact resistance between the parts is kept low. Here it is entirely desirable that the metal infiltrated into the connecting parts is also partially infiltrated into the connecting layer.

According to another feature of the invention, it is provided that at least one connecting part has an attachment with contact zones. In particular, if the connecting parts form continuations of the core part, in this way the contact zones for attaching the electrodes can be relocated from the "hot" area of the core part to the cooler areas. The molding of the attachments can be done in any way according to the above-mentioned purpose. It is proposed that the attachments, like the connecting parts, be made of an electrically conductive ceramic with electrically conductive metal infiltrated into them, and specifically suitably of the same ceramic from which the connecting parts are also made, and infiltrated with the same metal. Connecting parts and attachments here can also be made of a uniform fitting. If this is not possible for reasons of production technology, the attachments can also be produced separately—suitably in the same work step as the connecting parts—and then be connected to the respective connecting part. The same processes that were described above for the connection of connecting parts and core part are involved here.

The infiltration of the electrically conductive metal into the pores of the contact zones is performed by heating the relevant metal to at least its melting point, preferably even to a higher temperature, to perform a reaction burn. The temperature can also be so high that the infiltration is performed partly or completely in the vapor phase. If silicon is used as the metal, the temperature should be at least 1400° C., preferably 1600° C. The infiltration is performed in a vacuum or protective gas, to exclude the effect of oxygen.

The metal to be infiltrated can be applied in elementary form to the contact surfaces before the infiltration procedure, for example as a powder, paste, platelets, foil, or the like. But also possible is the use of a mixture of substances in which the metal is present in hyperstoichiometric form and is partially converted into an electrically conductive ceramic by heating to reaction temperature.

Alternatively to this it is provided that the contact zones are provided with a contact layer that contains substances for forming an electrically conductive ceramic compound, that these substances are converted into the ceramic compound by heating to at least reaction temperature and with the formation of fine-pored contact layers, and that the metal is infiltrated simultaneously or afterwards into the pores of the contact layers. The contact layer can be present for example in paste form and there can also be an excess of the metal to be infiltrated. Instead of this, the metal can also be applied in powder, paste and platelet form to the outside of the contact layer and then be subjected to infiltration conditions. Here the conversion is to be performed so that a porosity is achieved that is less than that of the molded part. This largely prevents the infiltration of the metal into the molded part itself. Further, it can be desirable that the metal be used in an amount such that it still infiltrates partially into the molded part.

The process according to the invention can be configured so that first a core part and a connecting part are produced, the metal is infiltrated only into the connecting parts, separately from the core part, and core and connecting parts are connected to one another. In this way it is assured that the infiltration of the metal remains limited to the it connecting parts. The connection of the connecting parts to the core part can be done by active soldering, high temperature soldering or diffusion welding. But suitably there is also an alternative process in which a connecting coating is applied to the surfaces of connecting parts and/or core part to be connected and the coating contains substances for the formation of an electrically conductive ceramic compound, and these substances are converted into the ceramic compound by heating to at least reaction temperature to form an electrically conductive connecting layer. Suitably, the conversion of the substances into the ceramic compound is simultaneous with the infiltration of the metal into the pores of the contact zones. Here it is favorable for the compound if substances are used for the connecting coatings that convert into the same ceramic compound as that of the molded part.

With this type of connection there is also the possibility of infiltrating an electrically conductive metal into the connecting layer, and it is also suitable if, in the conversion of the connecting layer, a lower porosity is achieved than that of the molded part. To the extent that a metallic ceramic compound is used, it is advantageous if a metal is used for the infiltration that is the same as the metal of the ceramic compound that forms the connecting layer. The infiltration of the metal can be performed by having the metal present in the connecting coating in hyperstoichiometric form. In doing so, an amount of metal is to be used such that it also partially infiltrates the molded part.

Finally it is provided according to the invention that the electrodes are connected to the contact surfaces by active soldering, high temperature soldering or diffusion welding. The thermal expansion of the electrodes should be matched to that of the molded part by geometric or material-specific factors.

BRIEF DESCRIPTION OF THE DRAWINGS

The invention is illustrated in the drawing in more detail based on embodiments. There are shown in.

Figure 1:
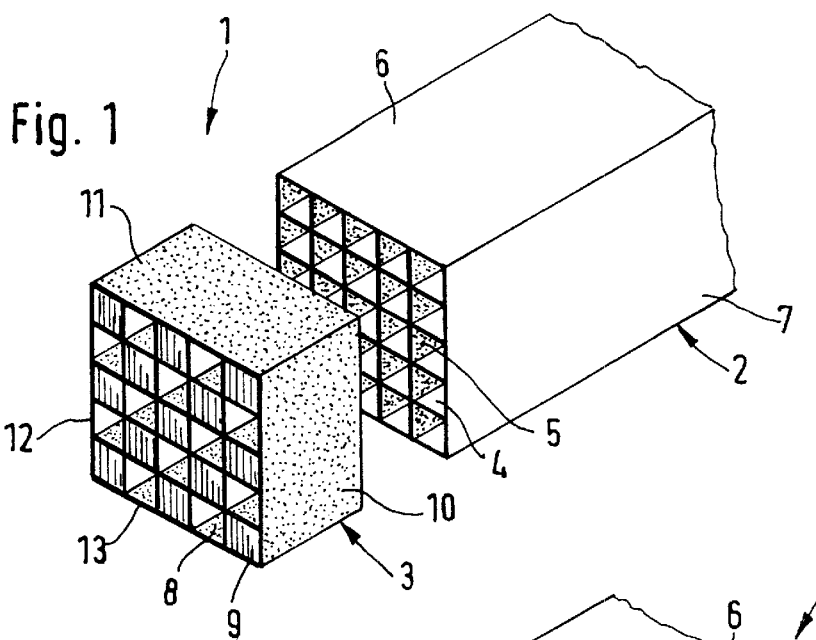
FIG. 1, the bias view of a part of a molded part with separate connecting part.

Molded part 1 represented in FIG. 1 consists of a core part 2 and two connecting parts 3 that form end parts and are intended, seen in the flow direction, for the end areas of core part 2 and only one of which is shown here. Core part 2 is a honeycomb and consequently has many flow-through channels extending in the lengthwise direction—designated for example by 4. Flow-through channels 4 are separated by porous partitions—designated for example by 5. Outer walls 6, 7 are also porous.

Connecting part 3 is made similar to core part 2 and forms, after connection of both parts 2, 3, a continuation of core part 2. It also has flow-through channels—designated by 8 for example—that lie coaxially to flow-through channels 4 in core part 2.

In any case each second flow-through channel 8 is closed by a plug or cover—designated by 9 for example—so that a chessboard-like pattern of closed and open flow-through channels 8 results. The connecting part not shown here and provided for the other end of core part 2 is made in the same way as an end part like connecting part 3, but with the difference that flow-through channels 8 that are open in connecting part 3 are closed and flow-through channels 8 that are closed in connecting part 3 are open. This way the gas stream flowing in by connecting part 3 is forced to flow through partitions 5, since only this way does it reach the flow-through channels that are open in the other connecting part. The flow through partitions 5 generates the filter effect of molded part 1.

Core part 2 and connecting parts 3 consist of an electrically conductive silicon carbide. Elementary silicon has additionally already been infiltrated into connecting parts 3. The infiltration is performed at 1600° C. under a vacuum, and the silicon has been applied as platelets to outer walls 10, 11, 12, 13. Suspensions, pastes or the like with elementary silicon can also be applied instead of platelets. There is further the possibility of dipping connecting parts 3 into the silicon after it is liquefied. The infiltration of the silicon into connecting parts 3 results in the latter obtaining electrical conductivity that is improved by a factor of 10 to 100. Further, a smooth surface results. Both favor the soldering on of electrodes by which then electrical current can be conducted through connecting parts 3 and core part 2.

After infiltration, connecting parts 3 are connected to core part 2. This can be done by active soldering. But there is also the possibility of providing the contact surfaces of core part 2 and connecting parts 3 with a paste made of silicon and—carbon powder—possibly also mixed with carbon-containing aids—and then placing connecting parts 3 on core part 2 and subjecting molded part 1 made this way to a reaction burn. The result is SiC, which enters a material connection with the SiC of connecting parts 3 and core part 2 during the reaction burn and thus takes care of a secure and additionally electrically conductive connection. To reduce the contact resistance, additional silicon can be infiltrated, for example by being present in the paste in hyperstoichiometric form.

Figure 2:
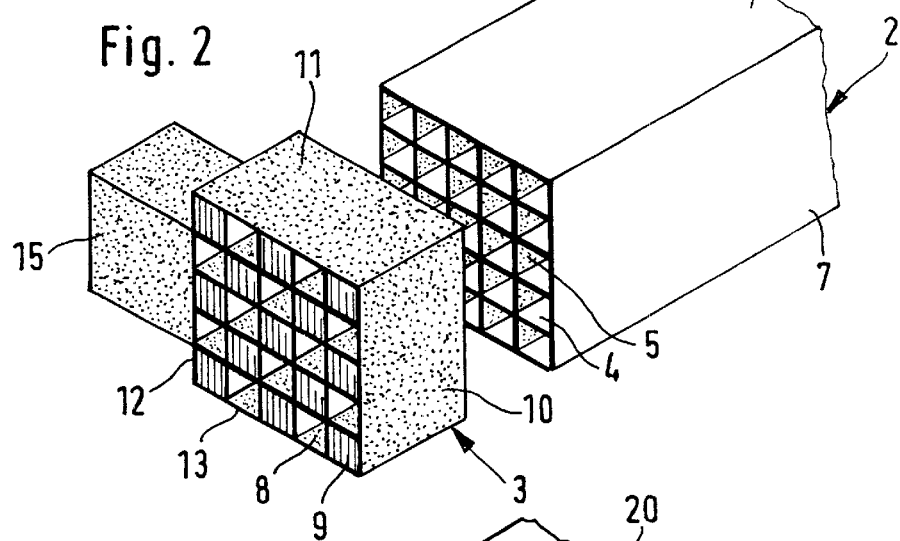
FIG. 2, the bias view of a molded part with another connecting part.

The embodiment according to FIG. 2 differs from the one according to FIG. 1 only in that connecting parts 3 have attachments 15 placed on them on one side, into which silicon is infiltrated in the way described above and they thus form contact zones for electrodes.

Figure 3:
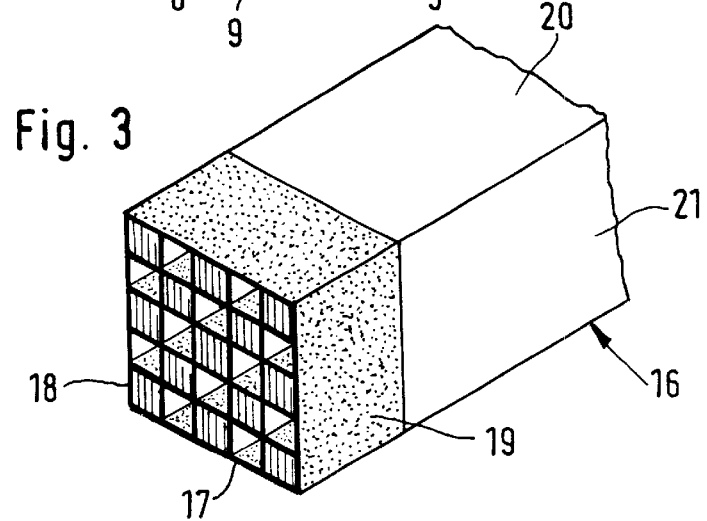
FIG. 3, the bias view of another molded part.

In the embodiment according to FIG. 3, there is a one piece molded part 16 made of silicon carbide with a length of 30 cm, an edge length of 4 cm and a length resistance of 3 Ohms at room temperature. In the same way as with connecting parts 3 according to FIGS. 1 and 2, each second flow-through channel—designated by 17 for example—on the ends of molded part 16 is closed—by a cover, designated by 18 for example—so that here also a chessboard-like pattern of open and closed flow-through channels 17 is formed. Open flow-through channels 17 on the side shown are closed on the other side, while flow-through channels 17 provided with covers 18 are open on the other side.

Both end areas of molded part 16 are provided with a contact layer 19 that extends around the periphery of molded part 16. Contact layer 19 is partially pressed into outer walls 20, 21 of molded part 16. For the production of the contact layer, silicon powder with a particle size of <100 μm first had been mixed with graphite powder with a particle size of <100 μm in a weight ratio of 3:1. Then a carbon-containing binder was added in an amount such that the carbon was present in a slightly hypostoichiometric form. This powder mixture was stirred with water in an amount such that a cohesive, viscous paste resulted that was applied to both ends of molded part 16 2 cm wide. Four g of the paste was applied as a thin layer on each end of molded part 16. The contact coatings thus made had an additional 2 to 7 g of silicon in platelet or powder form applied to them.

After drying at 130° C., molded part 16 was subjected to a reaction and infiltration burning at 1600° C. in a vacuum. In doing so, the binder was pyrolyzed and converted into reactive carbon. The contact coating underwent reaction into SiC while forming contact layer 19 with a considerably lesser porosity than that of molded part 16. Simultaneously, the elementary silicon was infiltrated into contact layer 19, and the infiltration remained limited essentially to contact layer 19, since because of its fine pores it generates higher capillary action than molded part 16 itself. Contact layer 19 was connected materially with the rest of molded part 16 and has essentially the same properties. In any case, the electrical conductivity is higher by a factor of 10 to 100 than in molded part 16 itself.

What is claimed is:

1. A molded part (1, 16) made of an electrically conductive ceramic having a flow-through part and contact zones (10, 11, 12, 13, 19) for attaching electrodes, wherein the contact zones (10, 11, 12, 13, 19) have an electrically conductive metal infiltrated into them to increase the electrical conductivity of the contact zones by a factor of 10 to 100 and the flow-through part comprises plural flow-through channels having porous partitions with pores-sized to permit a gas stream to flow through the partitions.

2. Molded part according to claim 1, wherein the contact zones comprise contact layers (19) made of an electrically conductive ceramic, into which the metal is infiltrated.

3. Molded part according to claim 2, wherein the ceramic of contact layers (19) is the same as the ceramic of the flow-through part (16).

4. Molded part according to claim 2, wherein contact layers (19) are made with finer pores than those of the flow-through part (16).

5. Molded part according to claim 2, wherein the contact layers (19) are pressed at least partially into the flow-through part (16).

6. Molded part according to claim 2, wherein the metal is infiltrated beyond the contact layers (19) into the flow-through part (16).

7. Molded part according to claim 1, wherein the flow-through part (1) has a core part (2) and a connecting part (3) that are connected to one another, and contact zones (10, 11, 12, 13) located on the exterior of the connecting part (3).

8. Molded part according to claim 7, wherein the core part (1) and the connecting part (3) have the same ceramic as a ceramic base.

9. Molded part according to claim 7, wherein the connecting part (3) forms an end part.

10. Molded part according to claim 7, wherein the connecting part (3) is a continuation of the core part (2).

11. Molded part according to claim 7, wherein the connecting part (3) is soldered or welded to the core part (2).

12. Molded part according to claim 7, wherein the connecting part (3) is connected to the core part (2) by a connecting layer made of an electrically conductive ceramic.

13. Molded part according to claim 12, wherein the ceramic of the core part (1) and of the connecting layer is the same.

14. Molded part according to claim 12, wherein the connecting layer is made with finer pores than the core part (1).

15. Molded part according to claim 12, wherein electrically conductive metal is infiltrated into the connecting layer.

16. Molded part according to claim 15, wherein the connecting layer consists of a metallic ceramic compound and the metal of the ceramic compound in the connecting layer and the metal infiltrated into it are the same.

17. Molded part according to claim 15, wherein the metal infiltrated into the connecting layer is also infiltrated into the core part (1).

18. Molded part according to claim 7, wherein the connecting part (3) has additional attachments (15) with contact zones.

19. Molded part according to claim 18, wherein the attachments consist of an electrically conductive ceramic with electrically conductive metal infiltrated into them.

20. A process for the production of ceramic contact zones (10, 11, 12, 13, 19) for attaching electrodes to molded parts (1, 16) that are flow-through parts with porous partitions having pores sized to permit a gas stream to flow therethrough and made of an electrically conductive ceramic, comprising the step of infiltrating an electrically conductive metal into the contact zones (10, 11, 12, 13, 19) to increase the electrical conductivity of the contact zones by a factor of 10 to 100.

21. Process according to claim 20, wherein a metallic ceramic compound is used and a metal is infiltrated into it that is the same as the metal of the ceramic compound.

22. Process according to claim 20, wherein the metal for the infiltration is heated to at least its melting temperature.

23. Process according to claim 20, wherein the infiltration is performed in a vacuum or protective gas.

24. Process according to claim 20, wherein the metal is applied to contact zones (10, 11, 12, 13, 19) before it is infiltrated.

25. Process according to claim 20, wherein a mixture of substances is used for the infiltration in which the metal is present in hyperstoichiometric form and is converted by heating to reaction temperature partially into an electrically conductive ceramic compound.

26. Process according to claim 20, wherein contact zones (10, 11, 12, 13) are provided with a contact coating that contains substances for the formation of an electrically conductive ceramic compound, wherein these substances are converted by heating to at least reaction temperature into a metal compound while forming porous contact layers (19) and wherein the metal simultaneously or afterwards is infiltrated into the pores of contact layers (19).

27. Process according to claim 26, wherein substances are used for the contact coatings that convert to the same ceramic compound as that of which molded part (16) is made.

28. Process according to claim 26, wherein porosity less than that of molded part (16) is achieved during the conversion.

29. Process according to claim 26, wherein substances are used for the contact coatings that are converted to a metallic ceramic compound and wherein a metal is used for the infiltration that is the same as the metal of this ceramic compound.

30. Process according to claim 26, wherein the metal in the contact coatings is present in hyperstoichiometric form.

31. Process according to claim 26, wherein the metal is applied to the contact coatings.

32. Process according to claim 26, wherein the contact coatings are at least partially pressed into molded part (16).

33. Process according to claim 26, wherein the metal is used in an amount such that it also infiltrates partially into molded part (16).

34. Process according to claim 33, wherein first a core part (2) and connecting parts (3) are produced, the metal is infiltrated into connecting parts (3), and core and connecting parts (2, 3) are connected to each other.

35. Process according to claim 34, wherein connecting parts (3) are placed on the ends of core part (2).

36. Process according to claim 35, wherein connecting parts (3) are connected to core part (2) by active soldering, high temperature soldering or diffusion welding.

37. Process according to claim 34, wherein a connecting coating is applied on the surfaces of connecting parts (3) and/or core part (2) that are to be connected, and it contains substances for the formation of an electrically conductive ceramic compound, and wherein these substances are converted into the ceramic compound by heating to at least reaction temperature while forming a connecting layer.

38. Process according to claim 37, wherein the conversion of the substances into the ceramic compound is performed simultaneously with the infiltration of the metal into the pores of contact zones (10, 11, 12, 13).

39. Process according to claim 37, wherein substances are used for the connecting coatings that are converted into the same ceramic compounds as that of molded part (1).

40. Process according to claim 37, wherein a porosity is achieved during the conversion that is less than that of molded part (1).

41. Process according to claim 37, wherein an electrically conductive metal is infiltrated into connecting layer.

42. Process according to claim 41, wherein substances are used for the connecting coating that are converted into a metallic ceramic compound and wherein a metal that is the same as the metal of this ceramic compound is used for the infiltration.

43. Process according to one claim 41, wherein the metal is used in an amount such that it also partially infiltrates molded part (1).

44. Process according to 34, wherein at least one connecting part (3) is provided with an attachment (15) that has contact zones.

45. Process according to claim 44, wherein connecting parts (15) consist of an electrically conductive ceramic with electrically conductive metal infiltrated into it.

46. Process according to claim 21, wherein the electrodes are connected to contact zones (10, 11, 12, 13, 19) by active soldering, high temperature soldering or diffusion welding.

47. Molded part produced by the process of claim 20.

48. A ceramic filter body, comprising:
   a ceramic filter section having a first ceramic electrical conductance, the ceramic filter section comprising plural flow-through channels having porous partitions with pores sized to permit a gas stream to flow through the partitions; and
   ceramic electrode attachment zones located on an exterior surface of the ceramic filter section, the ceramic electrode attachment zones having a second ceramic electrical conductance greater than the first ceramic electrical conductance by a factor of 10 to 100.

49. Molded part according to claim 1, wherein the ceramic of the flow-through part consists of a metallic ceramic compound and the metal of the ceramic compound and the infiltrated metal are the same.

* * * * *